(12) United States Patent
Li et al.

(10) Patent No.: US 11,174,898 B2
(45) Date of Patent: Nov. 16, 2021

(54) WIRING STRUCTURE OF MAGNETIC SUSPENSION BEARING, COMPRESSOR AND AIR CONDITIONER

(71) Applicant: Gree Green Refrigeration Technology Center Co., Ltd. of Zhuhai, Zhuhai (CN)

(72) Inventors: Xin Li, Zhuhai (CN); Yusheng Hu, Zhuhai (CN); Xiaobo Zhang, Zhuhai (CN); Jianning Liu, Zhuhai (CN); Fang Zhang, Zhuhai (CN); Gao Gong, Zhuhai (CN); Siyuan Tian, Zhuhai (CN); Chao Zhang, Zhuhai (CN); Jiuzhan Su, Zhuhai (CN); Ruhao Dong, Zhuhai (CN)

(73) Assignee: Gree Green Refrigeration Technology Center Co., Ltd. of Zhuhai, Zhuhai (CN)

( * ) Notice: Subject to any disclaimer, the term of this patent is extended or adjusted under 35 U.S.C. 154(b) by 95 days.

(21) Appl. No.: 16/632,754

(22) PCT Filed: Oct. 29, 2018

(86) PCT No.: PCT/CN2018/112307
§ 371 (c)(1),
(2) Date: Jan. 21, 2020

(87) PCT Pub. No.: WO2019/085845
PCT Pub. Date: May 9, 2019

(65) Prior Publication Data
US 2021/0156425 A1   May 27, 2021

(30) Foreign Application Priority Data
Nov. 3, 2017 (CN) .......................... 201711069958.6

(51) Int. Cl.
*F16C 32/04* (2006.01)
*H01F 27/28* (2006.01)
(Continued)

(52) U.S. Cl.
CPC ......... *F16C 32/0457* (2013.01); *H01F 27/28* (2013.01); *H01R 12/51* (2013.01);
(Continued)

(58) Field of Classification Search
CPC .............. F16C 32/0457; F16C 2362/52; F16C 32/0459; F16C 32/044; F16C 32/0406;
(Continued)

(56) References Cited

U.S. PATENT DOCUMENTS 8,330,311 B2 * 12/2012 Ramsey .............. F16C 32/0442
310/90.5
2008/0231128 A1 * 9/2008 Buhler .................. F16C 32/047
310/90.5

FOREIGN PATENT DOCUMENTS

CN     103427534 A    12/2013
CN     204517629 U     7/2015
(Continued)

*Primary Examiner* — Ahmed Elnakib
(74) *Attorney, Agent, or Firm* — The Webb Law Firm

(57) ABSTRACT

The present disclosure provides a wiring structure of a magnetic suspension bearing, a compressor and an air conditioner. The wiring structure of a magnetic suspension bearing, for electrically connect a control coil of the magnetic suspension bearing with an external power source, includes a circuit board; wherein the number of the magnetic suspension bearing is two or more, and the control coils of the two or more magnetic suspension bearings are all configured to electrically connect to the circuit board, and the circuit board is configured to connect to the external power source. The present disclosure has the advantages of reasonable design, simple structure, implementation of integrating wiring of multiple magnetic suspension bearings, (Continued)

simplification of wiring work, improvement of production efficiency, and improvement of wiring reliability.

10 Claims, 2 Drawing Sheets

(51) Int. Cl.
H01R 12/51 (2011.01)
H01R 31/06 (2006.01)
H02K 7/09 (2006.01)
(52) U.S. Cl.
CPC .............. *H01R 31/065* (2013.01); *H02K 7/09* (2013.01); *F16C 2362/52* (2013.01); *H01R 2201/22* (2013.01)
(58) Field of Classification Search
CPC ......... F16C 32/04; H01F 27/28; H01R 12/51; H01R 31/065; H01R 2201/22; H02K 7/09

USPC ....................................................... 310/90.5
See application file for complete search history.

(56) References Cited

FOREIGN PATENT DOCUMENTS

| CN | 107181359 A | 9/2017 |
| CN | 107887721 A | 4/2018 |
| CN | 207517921 U | 6/2018 |
| EP | 1517042 A1 | 3/2005 |
| JP | S60190697 A | 9/1985 |
| JP | 2001248641 A | 9/2001 |
| JP | 2010537122 A | 12/2010 |
| JP | 2013127274 A | 6/2013 |
| WO | 2007022657 A1 | 3/2007 |
| WO | 2009027485 A1 | 3/2009 |
| WO | 2018228261 A1 | 12/2018 |

* cited by examiner

WIRING STRUCTURE OF MAGNETIC SUSPENSION BEARING, COMPRESSOR AND AIR CONDITIONER

Cross Reference To Related Applications

This application is the United States national phase of International Application No. PCT/CN2018/112307 filed Oct. 29, 2018, and claims priority to Chinese Patent Application No. 201711069958.6 filed Nov. 3, 2017, the disclosures of which are herby incorporated by reference in their entirety.

TECHNICAL FIELD

The present disclosure relates to the technical field of an air conditioner, in particular to a wiring structure of a magnetic suspension bearing, a compressor and an air conditioner.

BACKGROUND

With the continuous progress of science and technology and the gradual improvement in productivity level, magnetic suspension bearings have been widely applied in the manufacture of compressors.

There are normally two magnetic suspension bearings in a compressor. At present, the two magnetic suspension bearings are electrically connected to the power source through the respective connecting wires respectively. In this way, it not only involves complicated wiring and low production efficiency, but also a poor reliability.

SUMMARY

In one aspect of the present disclosure, a wiring structure of a magnetic suspension bearing, for electrically connect a control coil of the magnetic suspension bearing with an external power source is provided. The wiring structure of a magnetic suspension bearing includes a circuit board; wherein the number of the magnetic suspension bearing is two or more, and the control coils of the two or more magnetic suspension bearings are all configured to electrically connect to the circuit board, and the circuit board is configured to connect to the external power source.

In some embodiments, the circuit board is provided with a wiring socket; and the circuit board is connected to the external power source through the wiring socket.

In some embodiments, there further includes an adapter member; the control coil of the magnetic suspension bearing is electrically connected to the circuit board through the adapter member, and the number of the adapter member is equal to the number of the magnetic suspension bearing in one-to-one correspondence.

In some embodiments, there further includes an adapter plate fixedly connected to the magnetic suspension bearing, wherein the adapter plate is electrically connected to the control coil of the magnetic suspension bearing; and the adapter member includes a first connection end and a second connection end, wherein the adapter member is connected to the circuit board through the first connection end, and connected to the adapter plate through the second connection end.

In some embodiments, the adapter plate is fixed to the magnetic suspension bearing by screws.

In some embodiments, the first connection end is welded on the circuit board.

In some embodiments, the circuit board is provided with a first connection socket, and the first connection end is provided with a first connection plug, wherein the first connection plug is configured to be inserted into the first connection socket, so as to connect the first connection end to the circuit board.

In some embodiments, the adapter plate is provided with a second connection socket, and the second connection end is provided with a second connection plug, wherein the second connection plug is configured to be inserted into the second connection socket, so as to connect the second connection end to the adapter plate.

In some embodiments, there further includes a housing; wherein the magnetic suspension bearing is disposed within the housing, and the circuit board is fixedly connected to the housing.

In some embodiments, the circuit board is fixed to the housing by screws.

In another aspect of the present disclosure, a compressor is provided. The compressor includes a magnetic suspension bearing, wherein the magnetic suspension bearing is electrically connected to an external power source using the wiring structure of a magnetic suspension bearing including any of the above technical features.

In a further aspect of the present disclosure, an air conditioner is provided. The air conditioner includes the compressor including any of the above technical features.

The wiring structure of a magnetic suspension bearing according to the present disclosure adopts such a technical solution that the control coils of two or more of the magnetic suspension bearings are all configured to electrically connect to the circuit board, and the circuit board is configured to connect to an external power source, which is adapted to implement integrating the wiring of multiple magnetic suspension bearings, so that the wiring work becomes more simple and the production efficiency is improved, and at the same time the wiring reliability is also improved.

BRIEF DESCRIPTION OF THE DRAWINGS

The accompanying drawings described herein are used to provide a further understanding of the present disclosure and constitute a part of the present application. The illustrative embodiments of the present disclosure as well as the illustrations thereof, which are used for explaining the present disclosure, do not constitute improper definitions on the present disclosure. In the accompanying drawings.

In the figures:
1—magnetic suspension bearing; 11—control coil;
2—circuit board; 21—wiring socket; 22—first connection socket;
3—adapter member; 31—first connection plug; 32—second connection plug;
4—adapter plate; 41—second connection socket;
5—housing.

Detailed Description of the Drawings

In order to make the object, technical solution and advantages of the present disclosure more explicit, the technical solution of the present disclosure will be explicitly and completely described below in conjunction with the specific embodiments of the present disclosure as well as the corresponding accompanying drawings. The described embodiments are merely non-limiting embodiments of the present disclosure. On the basis of the non-limiting embodiments of the present disclosure, non-limiting embodiments may be acquired by those skilled in the art that fall into the protection scope of the present disclosure.

It should be noted that, the terms "first", "second" and the like in the specification and claims of the present application and the above-described accompanying drawings are used to distinguish similar objects, and are not necessarily used to describe a specific order or sequence. It is to be understood that the data thus used is interchangeable as appropriate, such that the embodiments of the present application described here can be implemented in a sequence other than those illustrated or described here.

In some embodiments, the present disclosure provides a wiring structure of a magnetic suspension bearing, a compressor, and an air conditioner, which is adapted to implement integrating the wiring of multiple magnetic suspension bearings, so as to make a more simple wiring work, improve the production efficiency, and also improve the wiring reliability at the same time.

Figure 1:
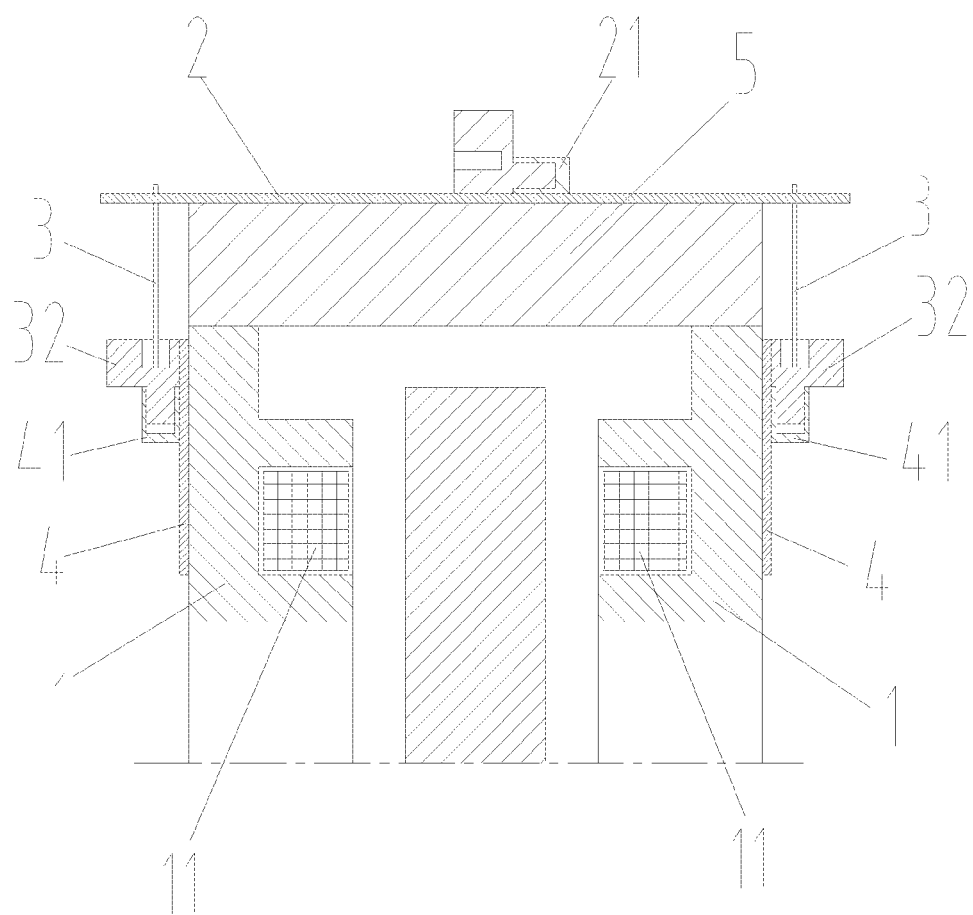
FIG. 1 is a schematic structural view of some embodiments of the wiring structure of a magnetic suspension bearing provided by the present disclosure.
Figure 2:
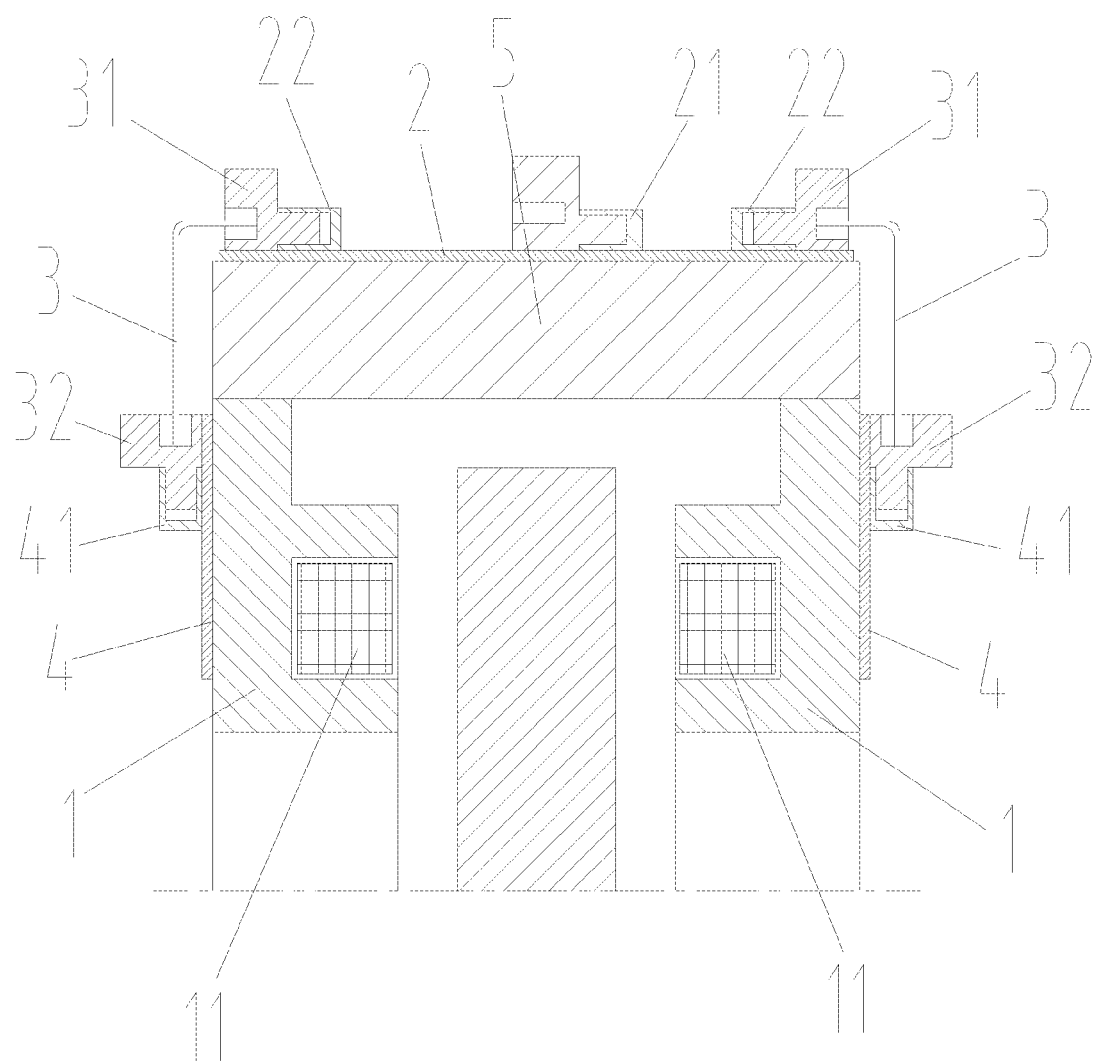
FIG. 2 is a schematic view of another manner of connecting an adapter member and a circuit board in FIG. 1.

As shown in FIG. 1 or 2, a wiring structure of a magnetic suspension bearing for electrically connect a control coil 11 of the magnetic suspension bearing 1 with an external power source, includes a circuit board 2. The number of the magnetic suspension bearings 1 is two or more, wherein the control coils 11 of the two or more magnetic suspension bearings 1 are all configured to electrically connect to the circuit board 2, and the circuit board 2 is configured to connect to an external power source.

In this way, the control coils 11 of the two or more magnetic suspension bearings 1 are first configured to electrically connect to the circuit board 2, and then electrically connect to the external power source through the circuit board 2. As compared with correlation technique, this implements integrating the wiring of multiple magnetic suspension bearings, so that the wiring work becomes more simple and the production efficiency is improved, and at the same time the wiring reliability is also improved.

In some embodiments, a wiring socket 21 is provided on the circuit board 2, and the circuit board 2 is connected to the external power source through the wiring socket 21. In some non-limiting embodiments, a connection plug is provided on the connection wire between the circuit board 2 and the external power source, and the circuit board 2 is connected to the external power source through the connection wire by inserting the connection plug into the connection socket 21, so that the connection between the circuit board 2 and the external power source becomes more simple and convenient, and at the same time the reliability of the connection is also improved.

In some non-limiting embodiments, as shown in FIG. 1 or 2, there further includes an adapter member 3, through which the control coil 11 of the magnetic suspension bearing 1 is electrically connected to the circuit board 2. The number of the adapter member 3 is equal to the magnetic suspension bearing, and one adapter member 3 corresponds to one magnetic suspension bearing.

In some non-limiting embodiments, there further includes an adapter plate 4 fixedly connected to the magnetic suspension bearing 1, wherein the adapter plate 4 is electrically connected to the control coil 11 of the magnetic suspension bearing 1. The adapter member 3 includes a first connection end and a second connection end, wherein the adapter member 3 is connected to the circuit board 2 through the first connection end, and connected to the adapter plate 4 through the second connection end. The adapter member 3 is electrically connected to the control coil 11 of the magnetic suspension bearing 1 through the adapter member 4, so that it is possible to reduce the installation difficulty of the adapter member 3. In some non-limiting embodiments, the adapter plate 4 is optionally fixed to the magnetic suspension bearing 1 by screws, but is not limited thereto, and other manners adopted to achieve the object are also optional.

In some non-limiting embodiments, a first connection manner between the adapter member 3 and the circuit board is shown in FIG. 1, the first connection end of the adapter member 3 is welded to the circuit board 2, so as to ensure a reliable connection between the adapter member 3 and the circuit board.

In some non-limiting embodiments, a second connection manner between the adapter member 3 and the circuit board is shown in FIG. 2, the circuit board 2 is provided with a first connection socket 22, and the first connection end is provided with a first connection plug 31 that is insertable into the first connection socket 22 to connect the first connection end to the circuit board 2. In this way, the adapter member 3 is optionally mounted to or detached from the circuit board 2 by plugging and unplugging, which makes the mounting and detaching work more simple, and at the same time which also ensures the reliability of the connection between the adapter member 3 and the circuit board 2.

In some non-limiting embodiments, the connection between the adapter member 3 and the adapter plate 4 is shown in FIG. 1 or 2. The adapter plate 4 is provided with a second connection socket 41, and the second connection end is provided with a second connection plug 32 that is insertable into the second connection socket 41 to connect the second connection end to the adapter plate 4. In this way, the adapter member 3 is optionally mounted to or detached from the adapter plate 4 by plugging and unplugging, which makes the mounting and detaching work more simple, and at the same time which also ensures the reliability of the connection between the adapter member 3 and the adapter plate 4.

In some non-limiting embodiments, there also includes a housing 5. In some non-limiting embodiments, the magnetic suspension bearing 1 is disposed within the housing 5, at this time, the circuit board 2 is configured to fixedly connect to the housing 5, so as to realize a stable installation state of the circuit board 2. In some non-limiting embodiments, the circuit board 2 is optionally fixed to the housing 5 by screws but is not limited thereto, and other manners adopted to realize the object are also optional.

In order to achieve the object of the present disclosure, in another aspect of the present disclosure, a compressor is provided. The compressor includes a magnetic suspension bearing which is electrically connected to an external power source by using the wiring structure of a magnetic suspension bearing described in any of the above embodiments.

In order to achieve the object of the present disclosure, in a further aspect of the present disclosure, an air conditioner is provided. The air conditioner includes the compressor described in the above embodiments.

The above embodiments are advantageous by way of their reasonable design and simple structure, which is adapted to implement integrating the wiring of multiple magnetic suspension bearings, so that the wiring work becomes more simple and the production efficiency is improved, and at the same time the wiring reliability is also be improved.

The above description describes embodiments of the present disclosure and is not intended to limit the present disclosure. For those skilled in the art, the present disclosure may have various modifications and changes. Any modification, equivalent replacement, or improvement made within the spirit and principle of the present disclosure shall be included in the scope of the claims of the present disclosure.

The invention claimed is:

1. A magnetic suspension bearing assembly, comprising:
at least one magnetic suspension bearing; and
at least one wiring structure for electrically connecting a control coil of the at least one magnetic suspension bearing with an external power source and at least one circuit board;
wherein a number of the at least one magnetic suspension bearing of the magnetic suspension bearing assembly is two or more,
wherein the control coil of the at least one magnetic suspension bearing is configured to electrically connect to the at least one circuit board,
wherein the at least one circuit board is configured to connect to the external power source,
wherein the at least one wiring structure further comprises at least one adapter member,
wherein the control coil of the at least one magnetic suspension bearing is electrically connected to the at least one circuit board through the at least one adapter member, and a number of the at least one adapter member is equal to the number of the at least one magnetic suspension bearing in one-to-one correspondence,
wherein the at least one wiring structure further comprises at least one adapter plate fixedly connected to the at least one magnetic suspension bearing, and the at least one adapter plate is electrically connected to the control coil of the at least one magnetic suspension bearing, and
wherein the at least one adapter member comprises a first connection end and a second connection end, the at least one adapter member connected to the at least one circuit board through the first connection end and connected to the at least one adapter plate through the second connection end.

2. The magnetic suspension bearing assembly according to claim 1, wherein the at least one circuit board is provided with a wiring socket; and
wherein the at least one circuit board is connected to the external power source through the wiring socket.

3. The magnetic suspension bearing assembly according to claim 1, wherein the at least one adapter plate is fixed to the at least one magnetic suspension bearing by screws.

4. The magnetic suspension bearing assembly according to claim 1, wherein the first connection end of the at least one adapter member is welded on the at least one circuit board.

5. The magnetic suspension bearing assembly according to claim 1, wherein the at least one circuit board is provided with a first connection socket, and the first connection end of the at least one adapter member is provided with a first connection plug, and
wherein the first connection plug is configured to be inserted into the first connection socket, so as to connect the first connection end to the at least one circuit board.

6. The magnetic suspension bearing assembly according to claim 1, wherein the at least one adapter plate is provided with a second connection socket, and the second connection end is provided with a second connection plug, wherein the second connection plug is configured to be inserted into the second connection socket, so as to connect the second connection end to the at least one adapter plate.

7. The magnetic suspension bearing assembly according to claim 1, further comprising a housing;
wherein the at least one magnetic suspension bearing is disposed within the housing, and the circuit board is fixedly connected to the housing.

8. The magnetic suspension bearing assembly according to claim 7, wherein the circuit board is fixed to the housing by screws.

9. A compressor comprising the magnetic suspension bearing assembly according to claim 1, wherein the at least one magnetic suspension bearing is electrically connected to an external power source using at least one wiring structure of at least one magnetic suspension bearing.

10. An air conditioner, comprising the compressor according to claim 9.

* * * * *